(12) United States Patent
Sharma et al.

(10) Patent No.: US 11,683,742 B2
(45) Date of Patent: Jun. 20, 2023

(54) METHODS AND INFRASTRUCTURE EQUIPMENT

(71) Applicant: Sony Group Corporation, Tokyo (JP)

(72) Inventors: Vivek Sharma, Basingstoke (GB); Hideji Wakabayashi, Basingstoke (GB); Yuxin Wei, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/722,398

(22) Filed: Apr. 18, 2022

(65) Prior Publication Data
US 2022/0240159 A1     Jul. 28, 2022

Related U.S. Application Data

(63) Continuation of application No. 17/041,449, filed as application No. PCT/EP2019/056494 on Mar. 14, 2019, now Pat. No. 11,337,141.

(30) Foreign Application Priority Data

Mar. 28, 2018     (EP) .................................... 18164804

(51) Int. Cl.
    *H04W 48/08*          (2009.01)
    *H04W 76/10*          (2018.01)
    (Continued)

(52) U.S. Cl.
CPC ........ *H04W 48/08* (2013.01); *H04B 7/15528* (2013.01); *H04W 76/10* (2018.02); *H04W 88/04* (2013.01)

(58) Field of Classification Search
CPC ..... H04W 48/08; H04W 76/10; H04W 88/04; H04W 84/047; H04B 7/15528
See application file for complete search history.

(56) References Cited

U.S. PATENT DOCUMENTS

2015/0181461 A1*   6/2015   Kim ...................... H04W 74/08
                                                                                                    370/236
2017/0064731 A1*   3/2017   Wang ................ H04W 72/1263
(Continued)

OTHER PUBLICATIONS

International Search Report and Written Opinion dated May 16, 2019 for PCT/EP2019/056494 filed on Mar. 14, 2019, 11 pages.
(Continued)

*Primary Examiner* — Hashim S Bhatti
(74) *Attorney, Agent, or Firm* — Xsensus LLP

(57) ABSTRACT

An infrastructure equipment for providing a wireless backhaul for another infrastructure equipment in a wireless communications network comprises a receiver configured to receive, from the other infrastructure equipment acting as a relay, uplink data transmitted by a communications device, a transmitter configured to transmit to the infrastructure equipment acting as a node via the wireless access interface, and a controller. The controller is configured to control the transmitter and receiver to establish a connection with the other infrastructure equipment, the connection providing the wireless backhaul for the transmission of data from the communications device to a core network of the wireless communications network via the other infrastructure equipment, and to transmit in a message on the downlink of the wireless access interface an indication of whether the other infrastructure equipment is permitted to transmit a request while in the connected mode.

15 Claims, 8 Drawing Sheets

(51) Int. Cl.
*H04B 7/155* (2006.01)
*H04W 88/04* (2009.01)

(56) References Cited

U.S. PATENT DOCUMENTS

| | | | | |
|---|---|---|---|---|
| 2019/0268824 | A1* | 8/2019 | Kubota | H04W 28/0289 |
| 2019/0306846 | A1* | 10/2019 | Luo | H04W 72/23 |
| 2021/0235512 | A1* | 7/2021 | Lee | H04W 48/02 |
| 2022/0007212 | A1* | 1/2022 | Hwang | H04W 76/38 |

OTHER PUBLICATIONS

3GPP, "3rd Generation Partnership Project; Technical Specification Group Services and System Aspects; Service accessibility," Release 16, 3GPP TS 22.011 V16.0.0, Dec. 2017, pp. 1-32.

3GPP, "5G; NG-RAN; F1 Application Protocol (F1AP)," 3GPP TS 38.473 version 15.3.0 Release 15, ETSI TS 138 473 V15.3.0, Oct. 2018, pp. 1-173.

3GPP, "5G; NG-RAN; F1 general aspects and principles," 3GPP TS 38.470 version 15.2.0 Release 15, ETSI TS 138 470 V15.2.0, Jul. 2018, pp. 1-13.

3GPP, "5G; Service requirements for next generation new services and markets," 3GPP TS 22.261 version 15.5.0 Release 15, ETSI TS 122 261 V15.5.0, Jul. 2018, pp. 1-52.

3GPP, "LTE; Evolved Universal Terrestrial Radio Access (E-UTRA); Radio Resource Control (RRC); Protocol specification," 3GPP TS 36.331 version 15.3.0 Release 15, ETSI TS 136 331 V15.3.0, Oct. 2018, pp. 1-915.

Holma, H. and Toskala, A., "System Architecture Based on 3GPP SAE," LTE for UMTS OFDMA and SC-FDMA based radio access, John Wiley and Sons, 2009, pp. 25-27.

LG Electronics Inc., "Access control mechanism," 3GPP TSG-RAN2 Meeting No. 98, R2-1705554, Hangzhou, China, May 15-19, 2017, pp. 1-4.

NTt Docomo, Inc., "Revised WID on New Radio Access Technology," 3GPP TSG RAN Meeting No. 78, RP-172834 (revision of RP-172115), Lisbon, Portugal, Dec. 18-21, 2017, 11 pages.

Qualcomm Inc., et al., "Way Forward—IAB Architecture for L2/3 relaying," 3GPP TSG-RAN WG3 Meeting No. 99, R3-181502, Athens, Greece, Jan. 26-Mar. 2, 2018, 6 pages.

* cited by examiner

US 11,683,742 B2

METHODS AND INFRASTRUCTURE EQUIPMENT

CROSS-REFERENCE TO RELATED APPLICATIONS

This application is a continuation of U.S. application Ser. No. 17/041,449, filed Sep. 25, 2020, which is based on PCT filing PCT/EP2019/056494, filed Mar. 14, 2019, which claims priority to EP 18164804.9, filed Mar. 28, 2018, the entire contents of each are incorporated herein by reference.

BACKGROUND

Field of Disclosure

The present disclosure relates to methods and apparatus for the transmission of data on a wireless backhaul communications link in a wireless communications system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

As radio technologies continue to improve, for example with the development of 5G ("New Radio"), the possibility arises for these technologies to be used not only by infrastructure equipment to provide service to wireless communications devices in a cell, but also for interconnecting infrastructure equipment to provide a wireless backhaul.

SUMMARY OF THE DISCLOSURE

The present disclosure can help address at least some of the issues discussed above.

Embodiments of the present technique can provide an infrastructure equipment for providing a wireless backhaul for another infrastructure equipment in a wireless communications network. The infrastructure equipment comprises a receiver configured to receive via a wireless access interface, from the other infrastructure equipment acting as a relay node, uplink data transmitted by a communications device, a transmitter configured to transmit to the infrastructure equipment acting as a relay node via the wireless access interface, and a controller. The controller is configured to control the transmitter and the receiver to establish a connection with the other infrastructure equipment, the connection providing the wireless backhaul for the transmission of the uplink data from the communications device to a core network part of the wireless communications network via the other infrastructure equipment so that the other infrastructure equipment enters a connected mode, and to transmit in a message on the downlink of the wireless access interface an indication of whether the other infrastructure equipment is permitted to transmit a request while in the connected mode.

Embodiments of the present technique can provide appropriate restrictions on infrastructure equipment and/or communications devices transmitting requests so that uplink traffic transmitted by wireless communications devices can be conveyed via a backhaul to the core network, with high reliability.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
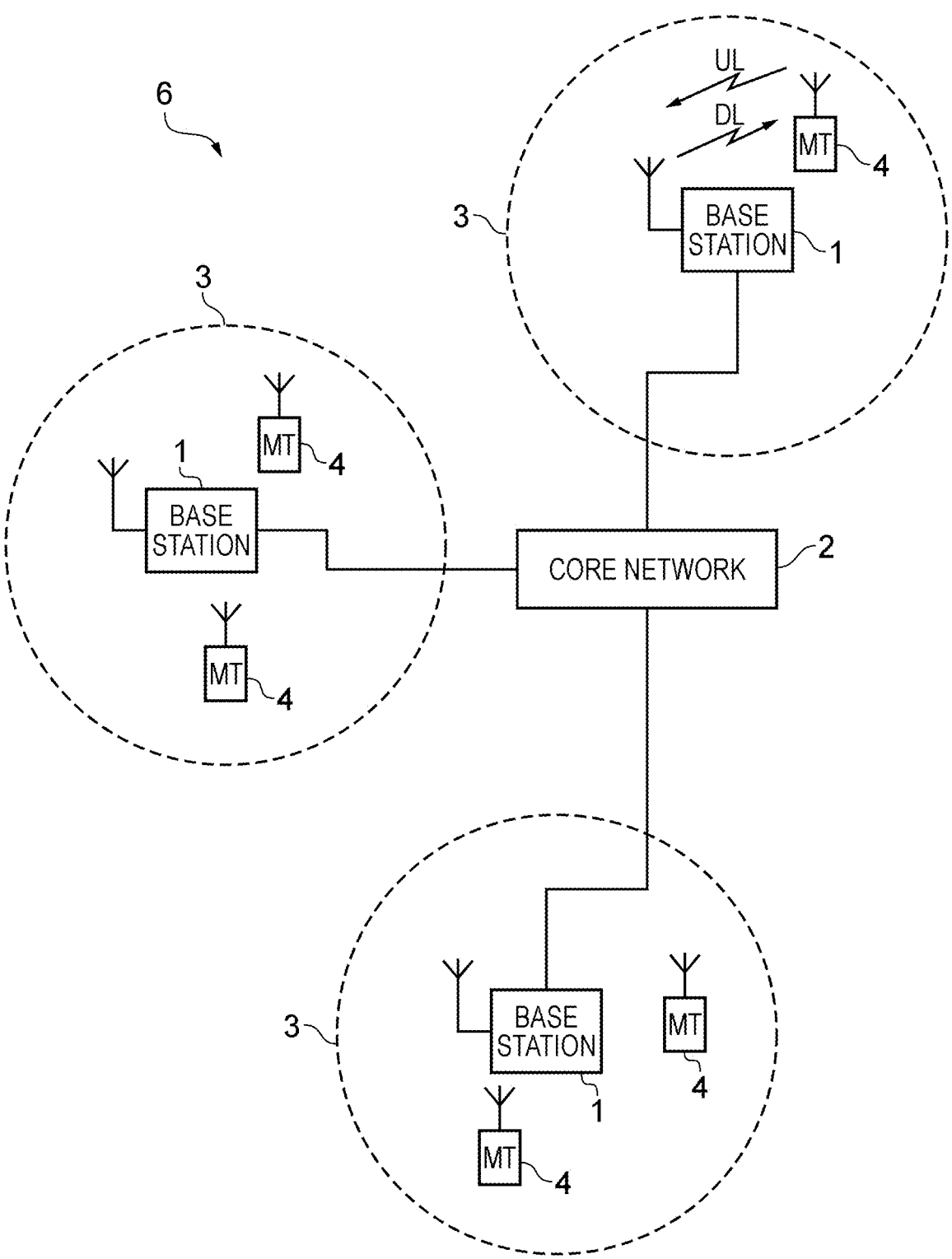
FIG. 1 schematically represents some aspects of a LTE-type wireless telecommunication system which may be configured to operate in accordance with certain embodiments of the present disclosure.

Long Term Evolution (LTE) Radio Access Technology (4G) FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas, remote radio heads, amplifiers, etc. Collectively, one or more base stations may form a radio access network.

Data is transmitted from the base stations 1 to the communications devices 4 within their respective coverage areas 3 via a radio downlink. Data is transmitted from the communications devices 4 to the base stations 1 via a radio uplink. The core network 2 routes data to and from the communications devices 4 via the respective base stations 1 and provides functions such as authentication, mobility management, charging and so on. A communications device may also be referred to as a mobile station, user equipment (UE), user terminal, mobile radio, terminal device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
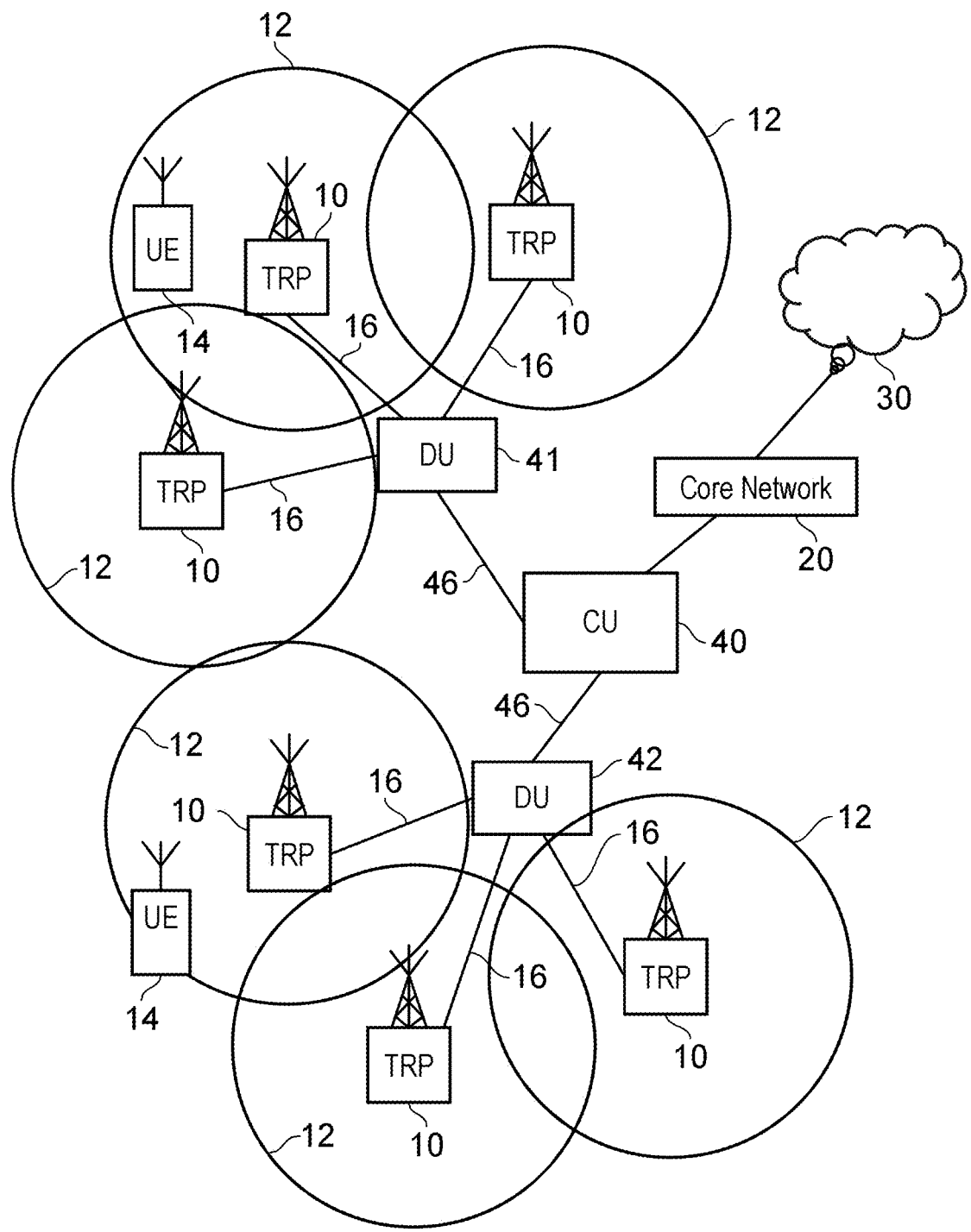
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for NR and 5G is shown in FIG. 2. A 3GPP work item on New Radio Access Technology (NR) has been defined [2]. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10 forms a cell of the wireless communications network as represented by a line 12. As such wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to a core network 20 which may contain all other functions required to transmit data for communicating to and from the wireless communications devices. The core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems. e.g. in accordance with the relevant standards.

The TRPs 10 of FIG. 2 may in part have a corresponding functionality to a base station or eNodeB of an LTE network. Similarly the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of anew RAT network will be functionally similar to, respectively, the core network component, base stations and communications devices of an LTE wireless communications network.

In terms of broad top-level functionality, the core network 20 of the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 212 via one of the distributed units 10 associated with the first communication cell 12.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated that the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
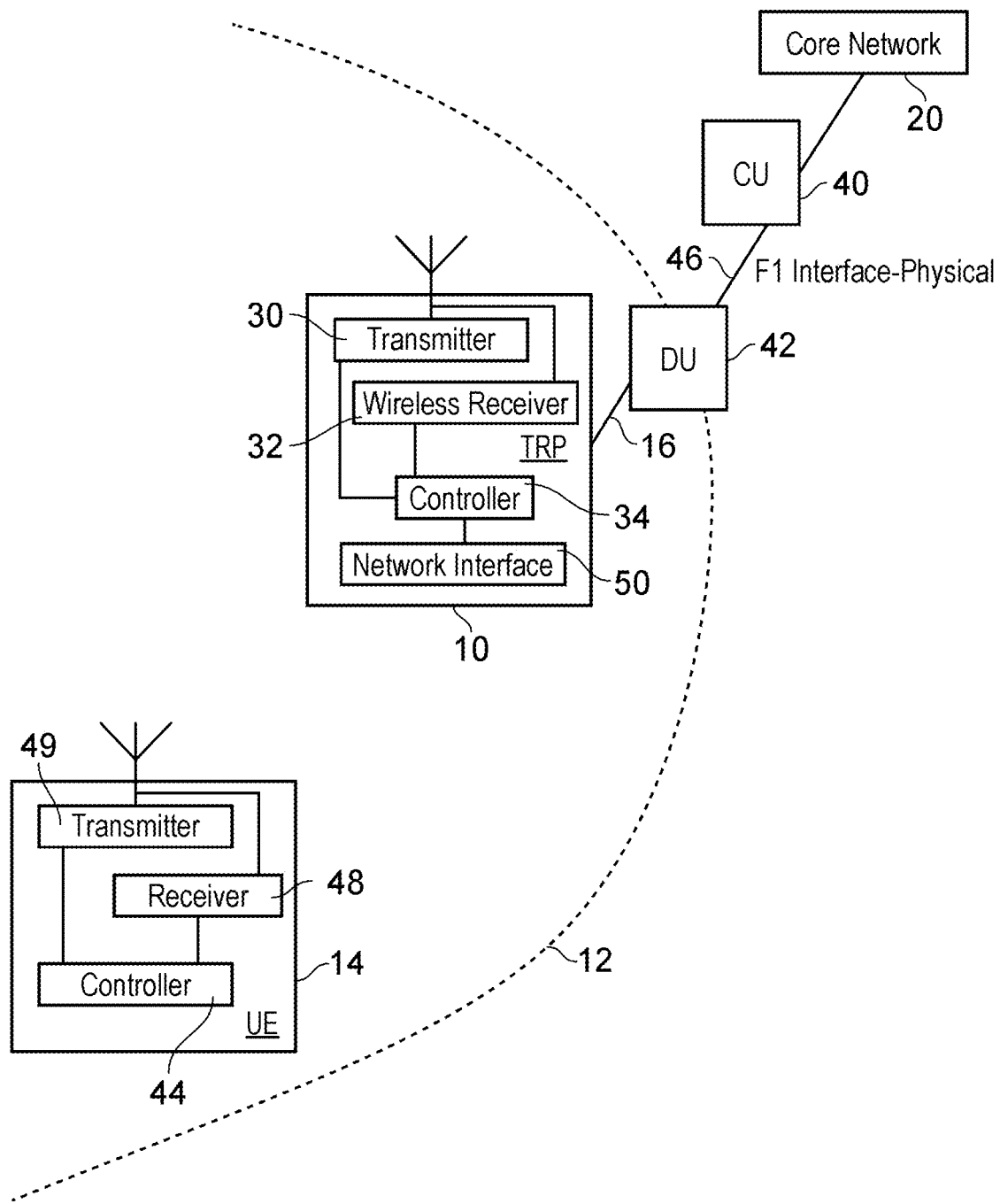
FIG. 3 is a schematic block diagram of some components of the wireless communications system shown in FIG. 2 in more detail in order to illustrate example embodiments of the present technique.

A more detailed diagram of some of the components of the network shown in FIG. 2 is provided by FIG. 3. In FIG. 3 a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation. The transmitters 30, 49 and the receivers 32, 48 may include radio frequency filters and amplifiers as well as signal processing components and devices in order to transmit and receive radio signals in accordance for example with the 5G standard.

The controllers 34, 44 may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

As shown in FIG. 3 the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection to the core network can be generally referred to as a backhaul comprising the interface 16 from the network interface 50 of the TRP 10 to the DU 42 and the F1 interface 46 from the DU 42 to the CU 40.

Figure 4:
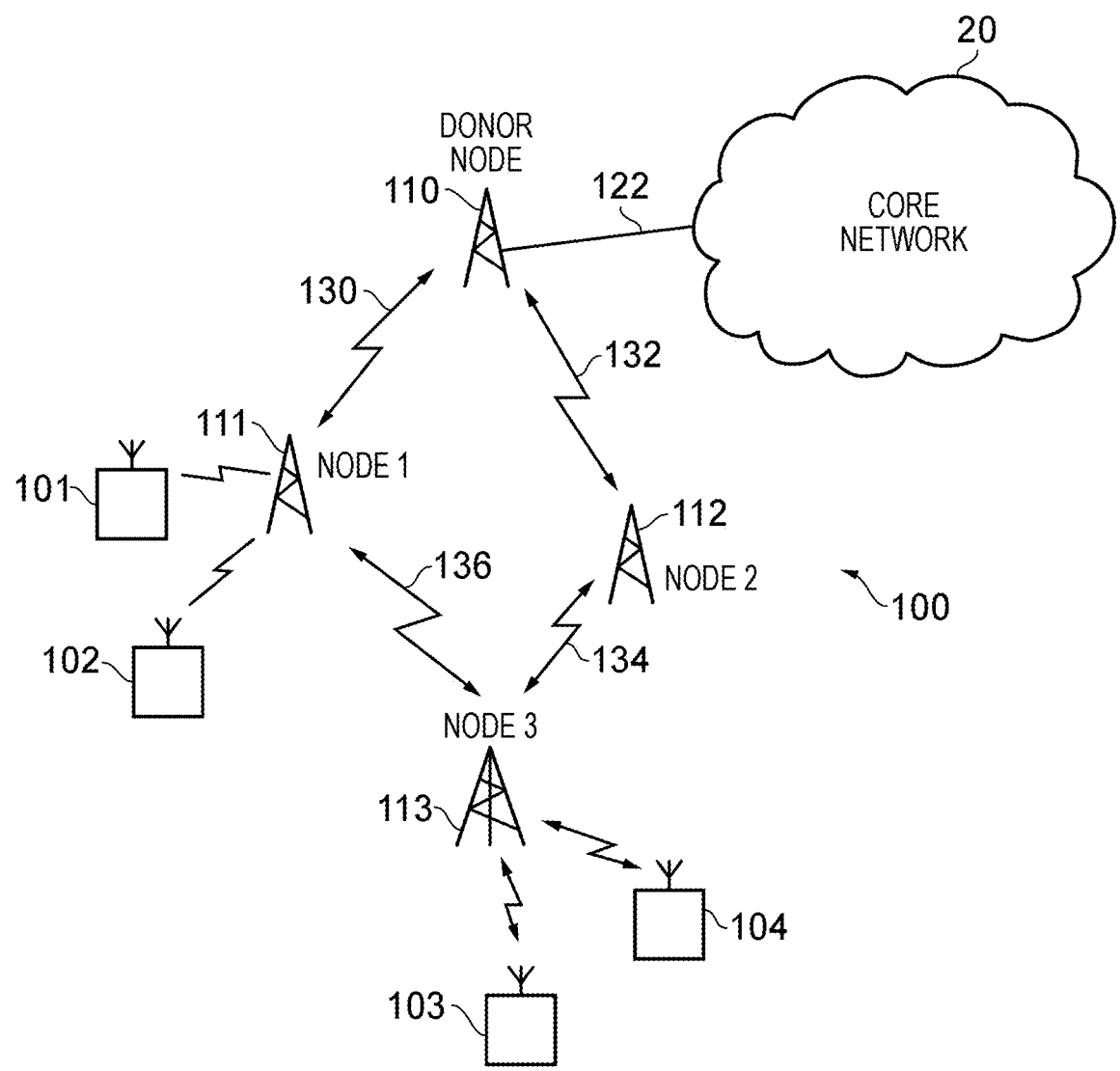
FIG. 4 schematically represents some aspects of a wireless telecommunication network which may be configured to operate in accordance with certain embodiments of the present disclosure.

Example embodiments of the present technique can be formed from a wireless communications network corresponding to that shown in FIGS. 1 or 2 as shown in FIG. 4. FIG. 4 provides an example in which cells of a wireless communications network are formed from infrastructure equipment which are provided with an Integrated Access and Backhaul (IAB) capability. The wireless communications network 100 comprises the core network 20 and a first, a second, a third and a fourth communications device (respectively 101, 102, 103 and 104) which may broadly correspond to the communications devices 4, 14 described above.

The wireless communications network 100 comprises a radio access network, comprising a first infrastructure equipment 110, a second infrastructure equipment 111, a third infrastructure equipment 112, and a fourth infrastructure equipment 113. Each of the infrastructure equipment provides a coverage area (i.e. a cell, not shown in FIG. 4) within which data can be communicated to and from the communications devices 101-104. For example, the fourth infrastructure equipment 113 provides a cell in which the third and fourth communications devices 103 and 104 may obtain service. The data is transmitted from the fourth infrastructure equipment 113 to the fourth communications device 104 within its respective coverage area (not shown) via a radio downlink. The data is transmitted from the fourth communications device 104 to the fourth infrastructure equipment 113 via a radio uplink.

The infrastructure equipment 110-113 in FIG. 4 may correspond broadly to the TRPs 10 of FIG. 2 and FIG. 3.

The first infrastructure equipment 110 in FIG. 4 is connected to the core network 20 by means of one or a sequence of physical connections. The first infrastructure equipment 110 may comprise the TRP 10 (having the physical connection 16 to the DU 42) in combination with the DU 42 (having a physical connection to the CU 40 by means of the F1 interface 46) and the CU 40 (being connected by means of a physical connection to the core network 20).

However, there is no physical connection between any of the second infrastructure equipment 111, the third infrastructure equipment 112, and the fourth infrastructure equipment 113 and the core network 20. As such, it may be necessary (or, otherwise determined to be appropriate) for data received from a communications device (i.e. uplink data), or data for transmission to a communications device (i.e. downlink data) to be transmitted to or from the core network 20 via infrastructure equipment (such as the first infrastructure equipment 110) which has a physical connection to the core network 20, even if the communications device is not currently served by the first infrastructure equipment 110 but is, for example, in the case of the wireless communications device 104, served by the fourth infrastructure equipment 113.

The second, third and fourth infrastructure equipment 111-113 in FIG. 4 may each comprise a TRP, broadly similar in functionality to the TRPs 10 of FIG. 2.

In some embodiments of the present technique, one or more of the second to fourth infrastructure equipment 111-113 in FIG. 4 may further comprise a DU 42, and in some embodiments of the present technique, one or more of the second to fourth infrastructure equipment 110-113 may comprise a DU and a CU.

In some embodiments of the present technique, the CU 40 associated with the first infrastructure equipment 110 may perform the function of a CU not only in respect of the first infrastructure equipment 110, but also in respect of one or more of the second, the third and the fourth infrastructure equipment 111-113.

In order to provide the transmission of the uplink data or the downlink data between a communications device and the core network, a route is determined by any suitable means, with one end of the route being an infrastructure equipment physically connected to a core network and by which uplink and downlink traffic is routed to or from the core network.

In the following, the term 'node' is used to refer to an entity which forms a part of a route for the transmission of the uplink data or the downlink data.

An infrastructure equipment which is physically connected to the core network may provide communications resources to other infrastructure equipment and so is referred to as acting as a 'donor node'. An infrastructure equipment which acts as an intermediate node (i.e. one which forms a part of the route but is not acting as a donor node) is referred to as a 'relay node'. The relay node at the end of the route which is the infrastructure equipment controlling the cell in which the communications device is obtaining service is referred to as an 'end node'.

In the wireless network illustrated in FIG. 4, each of the first to fourth infrastructure equipment 110-113 may therefore function as nodes. For example, a route for the transmission of the uplink data from the fourth communications device 104 may consist of the fourth infrastructure equipment 113 (acting as the end node), the third infrastructure equipment 112 (acting as a relay node), and the first infrastructure equipment 110 (acting as the donor node). The first infrastructure 110, being connected to the core network 20, transmits the uplink data to the core network 20.

For clarity and conciseness in the following description, the first infrastructure equipment 110 is referred to below as the 'donor node', the second infrastructure equipment 111 is referred to below as 'Node 1', the third infrastructure equipment 112 is referred to below as 'Node 2' and the fourth infrastructure equipment 113 is referred to below as 'Node 3'.

For the purposes of the present disclosure, the term 'upstream node' is used to refer to a node acting as a relay node or a donor node in a route, which is a next hop when used for the transmission of data via that route from a wireless communications device to a core network. Similarly, 'downstream node' is used to refer to a relay node from which uplink data is received for transmission to a core network. For example, if uplink data is transmitted via a route comprising (in order) the Node 3 113, the Node 1 111 and the donor node 110, then the donor node 110 is an upstream node with respect to the Node 1 111, and the Node 3 113 is a downstream node with respect to the Node 1 111.

More than one route may be used for the transmission of the uplink data from a given communications device; this is referred to herein as 'multi-connectivity'. For example, the uplink data transmitted by the fourth wireless communications device 104 may be transmitted either via the Node 3 113 and the Node 2 112 to the donor node 110, or via the Node 3 113 and the Node 1 111 to the donor node 110.

In the following description, example embodiments are described in which each of the nodes is an infrastructure equipment; the present disclosure is not so limited. A node may comprise at least a transmitter, a receiver and a controller. In some embodiments of the present technique, the functionality of a node (other than the donor node) may be carried out by a communications device, which may be the communications device 4 (of FIG. 1) or 14 (of FIG. 2), adapted accordingly. As such, in some embodiments of the present technique, a route may comprise one or more communications devices. In other embodiments, a route may consist of only a plurality of infrastructure equipment.

In some embodiments of the present technique, an infrastructure equipment acting as a node may not provide a wireless access interface for the transmission of data to or by a communications device other than as part of an intermediate transmission along a route.

In some embodiments of the present technique, a route is defined considering a wireless communications device (such as the fourth wireless communications device 104) as the start of a route. In other embodiments a route is considered to start at an infrastructure equipment which provides a wireless access interface for the transmission of the uplink data by a wireless communications device.

Access Class Barring

Conventional wireless communications networks are typically dimensioned in order to provide reliable service with high probability and a high degree of availability. However, demand can obviously vary over time, or other operational issues may arise such that a particular infrastructure equipment may become unable to provide reliable service. In order to effectively manage such overload scenarios, infrastructure equipment may impose restrictions on communications devices (such as the communications devices 4, 14, 101-104), so that, for example, they may be forbidden from initiating a service request procedure, or from requesting a radio link control (RLC) connection.

The inventors of the present technique have recognised that, in the case where wireless backhaul is used (for example, by means of an integrated access and wireless backhaul techniques described above) there is a need to provide suitable mechanisms to restrict access to communications devices and infrastructure equipment, in order to ensure that backhaul connectivity can be ensured in an efficient manner, taking into account traffic loads, congestion and other operational considerations which may limit the ability of each node in a route to support the required quality of service.

To address this problem, the present techniques provide for an infrastructure equipment providing a wireless backhaul in a wireless communications network.

An infrastructure equipment for providing a wireless backhaul for another infrastructure equipment in a wireless communications network comprises a receiver configured to receive via a wireless access interface, from the other infrastructure equipment acting as a relay node, uplink data transmitted by a communications device, a transmitter configured to transmit to the infrastructure equipment acting as a relay node via the wireless access interface, and a controller. The controller may be configured to control the transmitter and the receiver to establish a connection with the other infrastructure equipment, the connection providing the wireless backhaul for the transmission of the uplink data from the communications device to a core network part of the wireless communications network via the other infrastructure equipment so that the other infrastructure equipment enters a connected mode, and to transmit in a message on the downlink of the wireless access interface an indication of whether the other infrastructure equipment is permitted to transmit a request while in the connected mode.

Each of the first infrastructure equipment acting as the donor node 110 and the second to fourth infrastructure equipment acting as the Nodes 1-3 111-113 may communicate with one or more other nodes by means of an inter-node wireless communications link, which may also be referred to as a wireless backhaul communications links. For example, FIG. 4 illustrates four inter-node wireless communications links 130, 132, 134, 136.

Each of the inter-node wireless communications links 130, 132, 134, 136 may be provided by means of a respective wireless access interface. Alternatively, two or more of the inter-node wireless communications links 130, 132, 134, 136 may be provided by means of a common wireless access interface and in particular, in some embodiments, all of the inter-node wireless communications links 130, 132, 134, 136 are provided by a shared wireless access interface.

A wireless access interface which provides an inter-node wireless communications link may also be used for communications between an infrastructure equipment (which may be a node) and a communications device which is served by the infrastructure equipment. For example, the fourth wireless communications device 104 may communicate with the infrastructure equipment Node 3 113 using the wireless access interface which provides the inter-node wireless communications link 134 connecting the Node 3 113 and the Node 2 112.

The wireless access interface(s) providing the inter-node wireless communications links 130, 132, 134, 136 may operate according to any appropriate specifications and techniques. In some embodiments, a wireless access interface used for the transmission of data from one node to another uses a first technique and a wireless access interface used for the transmission of data between an infrastructure equipment acting as a node and a communications device may use a second technique different from the first. In some embodiments, the wireless access interface(s) used for the transmission of data from one node to another and the wireless access interface(s) used for the transmission of data between an infrastructure equipment and a communications device use the same technique.

Examples of wireless access interface standards include the third generation partnership project (3GPP)-specified GPRS/EDGE ("2G"), WCDMA (UMTS) and related standards such as HSPA and HSPA+("3G"). LTE and related standards including LTE-A ("4G"), and NR ("5G"). Techniques that may be used to provide a wireless access interface include one or more of TDMA, FDMA. OFDMA. SC-FDMA, CDMA. Duplexing (i.e. the transmission over a wireless link in two directions) may be by means of frequency division duplexing (FDD) or time division duplexing (TDD) or a combination of both.

In some embodiments of the present technique, two or more of the inter-node wireless communications links 130, 132, 134, 136 may share communications resources. This may be because two or more of the inter-node wireless communications links 130, 132, 134, 136 are provided by means of a single wireless access interface or because two or more of the inter-node wireless communications links 130, 132, 134, 136 nevertheless operate simultaneously using a common range of frequencies.

The nature of the inter-node wireless communications links 130, 132, 134, 136 may depend on the architecture by which the wireless backhaul functionality is achieved.

Various architectures have been proposed in order to provide the IAB functionality. Embodiments of the present technique are not restricted to a particular architecture. However, a number of candidate architectures which have been considered in, for example, 3GPP document R3-181502 [6] are described below.

Figure 5:
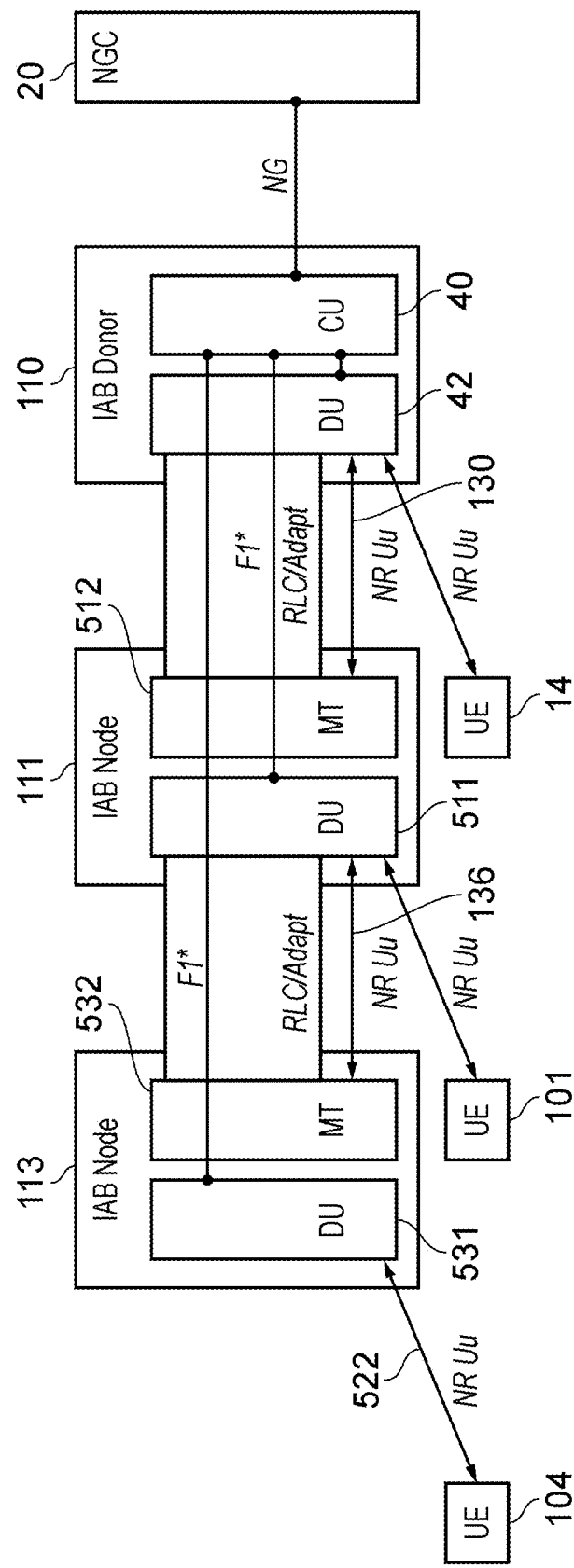
FIG. 5 is a block diagram illustrating a possible network architecture for providing a wireless backhaul by means of Integrated Access and Backhaul in a wireless telecommunication network which may be configured to operate in accordance with certain embodiments of the present disclosure.

FIG. 5 illustrates one possible architecture by which the donor Node 110, the Node 1 111 and the Node 3 113 may provide a wireless backhaul to provide connectivity for the UEs 104, 101, 14.

In FIG. 5, each of the infrastructure equipment acting as an IAB nodes 111, 113 and the donor node 110, includes a distributed unit (DU) 42, 511, 531 which communicates with the UEs 14, 101, 104 and (in the case of the DUs 42, 511 associated with the donor node 110 and the Node 1 111) with the respective downstream IAB nodes 111, 113. Each of the IAB nodes 111, 113 (not including the donor node 110) includes a mobile terminal (MT) 512, 532, which includes a transmitter and receiver (not shown) for transmitting and receiving data to and from the DU of an upstream IAB node and an associated controller (not shown). The inter-node wireless communications links 130, 136 may be in the form of new radio (NR) "Uu" wireless interfaces. The mobile terminals 512, 532 may have substantially the same functionality as a UE, at least at the access stratum (AS) layer. Notably, however, an MT may not have an associated subscriber identity module (SIM) application; a UE may be conventionally considered to be the combination of an MT and a SIM application.

The Uu wireless interfaces used by IAB nodes to communicate with each other may also be used by UEs to transmit and receive data to and from the DU of the upstream IAB node. For example, the Uu interface 520 which is used by the Node 1 111 for communication with the donor node 110 may also be used by the UE 14 to transmit and receive data to and from the donor node 110.

Similarly, an end node (such as the Node 3 113) may provide a Uu wireless interface 522 for the fourth UE 104 to communicate with the DU 531 of the Node 3 113.

Figure 6:
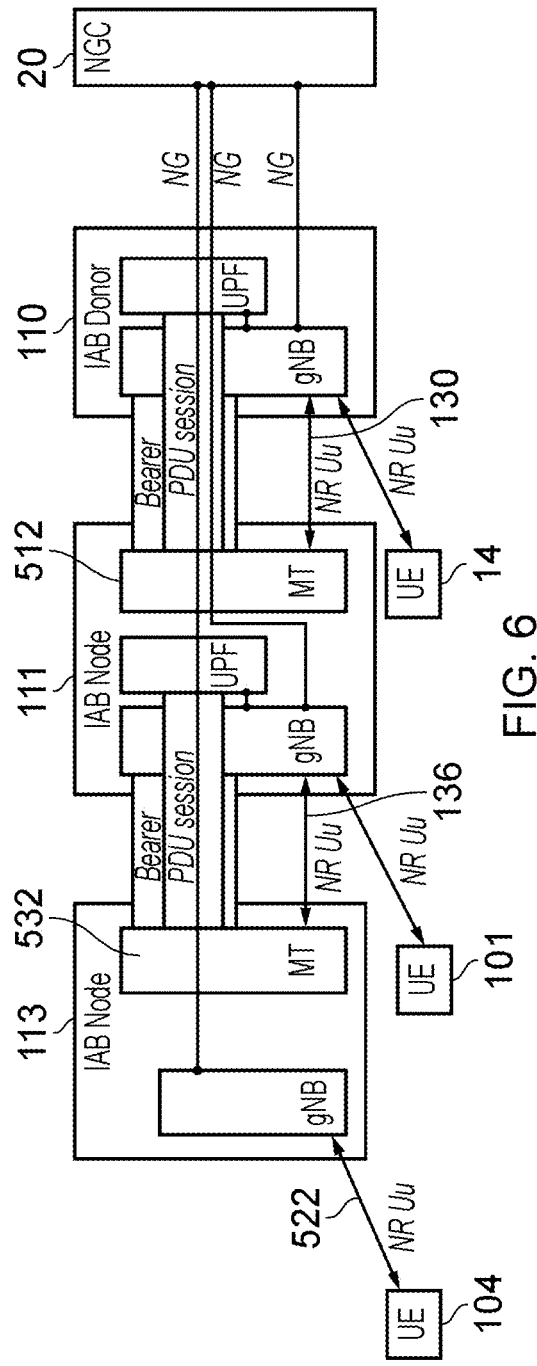
FIG. 6 is a block diagram illustrating a further possible network architecture for providing a wireless backhaul by means of Integrated Access and Backhaul in a wireless telecommunication network which may be configured to operate in accordance with certain embodiments of the present disclosure.
Figure 7:
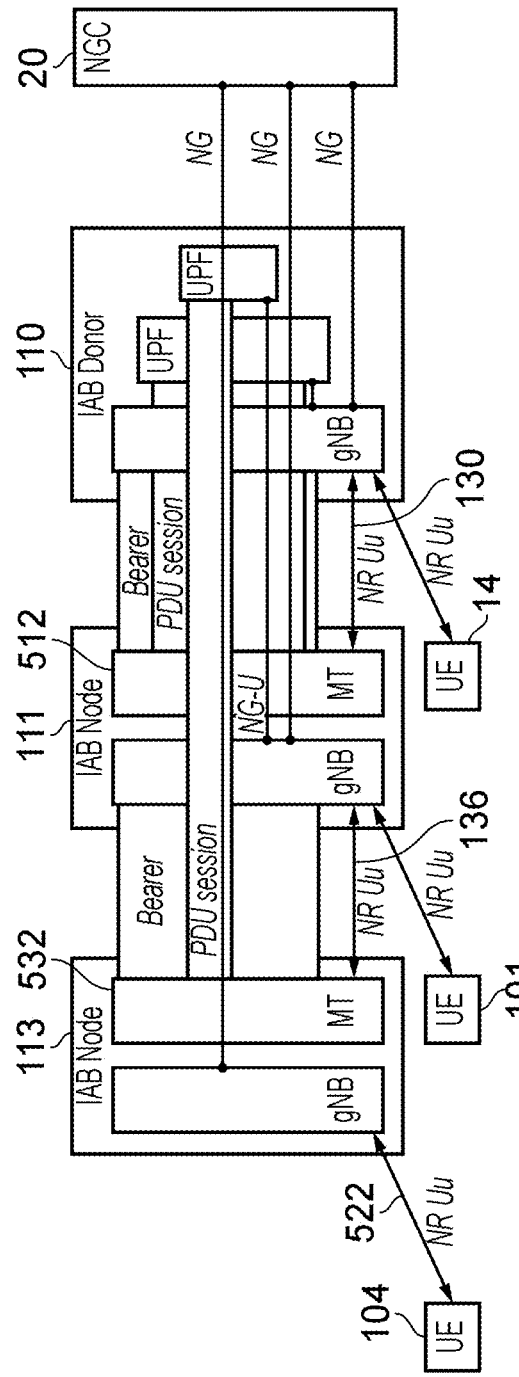
FIG. 7 is a block diagram illustrating yet a further possible network architecture for providing a wireless backhaul by means of Integrated Access and Backhaul in a wireless telecommunication network which may be configured to operate in accordance with certain embodiments of the present disclosure.

Alternative candidate architectures for the provision of TAB are provided in FIG. 6 and FIG. 7. In both FIG. 6 and FIG. 7, each TAB node includes a gNB function, providing a wireless access interface for the use of downstream TAB nodes and wireless communications devices.

FIG. 7 differs from FIG. 6 in that, in FIG. 6, PDU sessions are connected end-on-end to form the wireless backhaul; in FIG. 7, PDU sessions are encapsulated so that each TAB node may establish an end-to-end PDU session which terminates at the TAB donor node 110.

According to a conventional techniques. UEs may be restricted by means of access class barring (ACB) so that they cannot access a cell. This may be applied in order to reduce (or to avoid any further increase of) a load on an infrastructure equipment.

In summary, conventional ACB is carried out in the following manner:

An infrastructure equipment broadcasts a number of ACB-related parameters. An example of such a parameter is a 'barring factor'. This may be a value, for example, between 0 and 1. A UE wishing to initiate a connection must, prior to transmitting, generate a random number between 0 and 1 and compare it to the barring factor transmitted in the cell. If the generated number is lower than the barring factor, then access is permitted; otherwise, the cell is to be considered barred.

The ACB-related parameters may also include boolean (or binary) indications, each corresponding to a particular category of devices, which may be further characterised based on specific subscriber properties that are configured in a subscriber identity module (SIM) application. For example, subscribers who are members of the emergency services may belong to one category; subscriber accounts used for the test equipment of the mobile network operator may belong to a different category. These categories may be associated with specific access classes (for example, Access classes 11 to 15, inclusive) as set out in 3GPP TS 22.011 v.16.0.0 [4].

For each such category, a binary indication is transmitted in broadcast system information, indicating whether it is permitted for the UE to initiate a service request or to establish a radio resource control (RRC) connection.

ACB parameters may be transmitted in respect of different services, for example, for mobile-originated data transmissions or for circuit switched fallback (CSFB). A UE must apply the ACB parameters relevant to the service which it has been requested to initiate (e.g. by higher protocol layers, or by user interaction).

For 5G, a new approach for ACB may be provided, based on a UE being associated with one or more of Access Identities and one of the Access Categories. The Access Categories may be broadly similar in principle to the Access Classes used in other technologies.

Details of the conventional access class barring procedures may be found in 3GPP TS 36.331 v.15.0.1 [3] and the specifications referenced therein. Details of the principles of Access Categories and Access Identities may be found in 3GPP TS 22.261 v.16.2.0 151.

The inventors of the presently-disclosed techniques have appreciated that at the access stratum level, a UE (such as the first UE 101) and an IAB node (such as the Node 3 113) may comprise similar functionality. However, they have further appreciated that the present system of ACB is unsuitable for use by IAB donor nodes, for at least the following reason:

A UE (such as the fourth UE 104) requesting a service from an IAB node (such as the IAB Node 3 113), having determined, based on ACB parameters transmitted by the IAB Node 3 113, that it is permitted to request the service, may subsequently fail to obtain the service as a result of a failure of either its serving IAB Node 113 or an upstream IAB Node (such as the Node 1 111) to obtain service from a respective upstream node (such as the IAB node 1 111 or the donor node 110, respectively) as a result of ACB applied to the IAB node. Such a failure would result in the fourth UE 104 being unable to connect to the core network 20, in spite of their being no indication to the fourth UE 104 that such a connection could not be obtained. In particular, the fourth UE 104 may be a legacy UE or otherwise not adapted to be aware of the possibility of the use of a wireless backhaul.

The UE 104 may receive an RRC connection reject or RRC connection release as a result of the failure of the infrastructure nodes acting as relays to establish a wireless backhaul connection.

Requests from one IAB node to another may be initiated (or triggered) for a number of reasons. Some may result from the actions of a UE (for example, the request from a UE to transmit uplink data as described above). Others may be related to IAB operational aspects associated with the provision of the wireless backhaul, such as to report a node status, for route management purposes, or for quality of service (QoS) or load balancing purposes.

The frequency of requests transmitted by a downstream IAB node in an upstream direction may depend on the architecture in use. For example, in the architecture of FIG. 5, the presence of the CU in the donor node 110 means that most bearer establishment request messages will originate at the donor node 110 and will be transmitted downstream.

In contrast, in the architectures of FIG. 6 and FIG. 7, it may be that an individual UE connection establishment request results in one or more requests (e.g. a service request, bearer establishment request or new tunnel request) by an IAB node to an upstream IAB node.

In some embodiments of the present technique, the first IAB node may already be in an RRC connected mode, having established an RRC connection with its respective upstream node.

According to an example embodiment of the present technique, an infrastructure equipment such as the infrastructure equipment acting as the Node 1 111 providing a wireless backhaul is configured to transmit, in a message on the downlink of a wireless access interface, an indication of whether a second infrastructure equipment (such as the infrastructure equipment acting as the Node 3 113) is permitted to request a service while in the connected mode. The wireless backhaul may be provided for the transmission of data having been transmitted on an uplink of a wireless access interface (such as the interface 522) by a wireless communications device (such as the fourth wireless communications device 104), or having been received by a donor node (such as the donor node 110) from a core network (such as the core network 20) for transmission to the wireless communications device.

Figure 8:
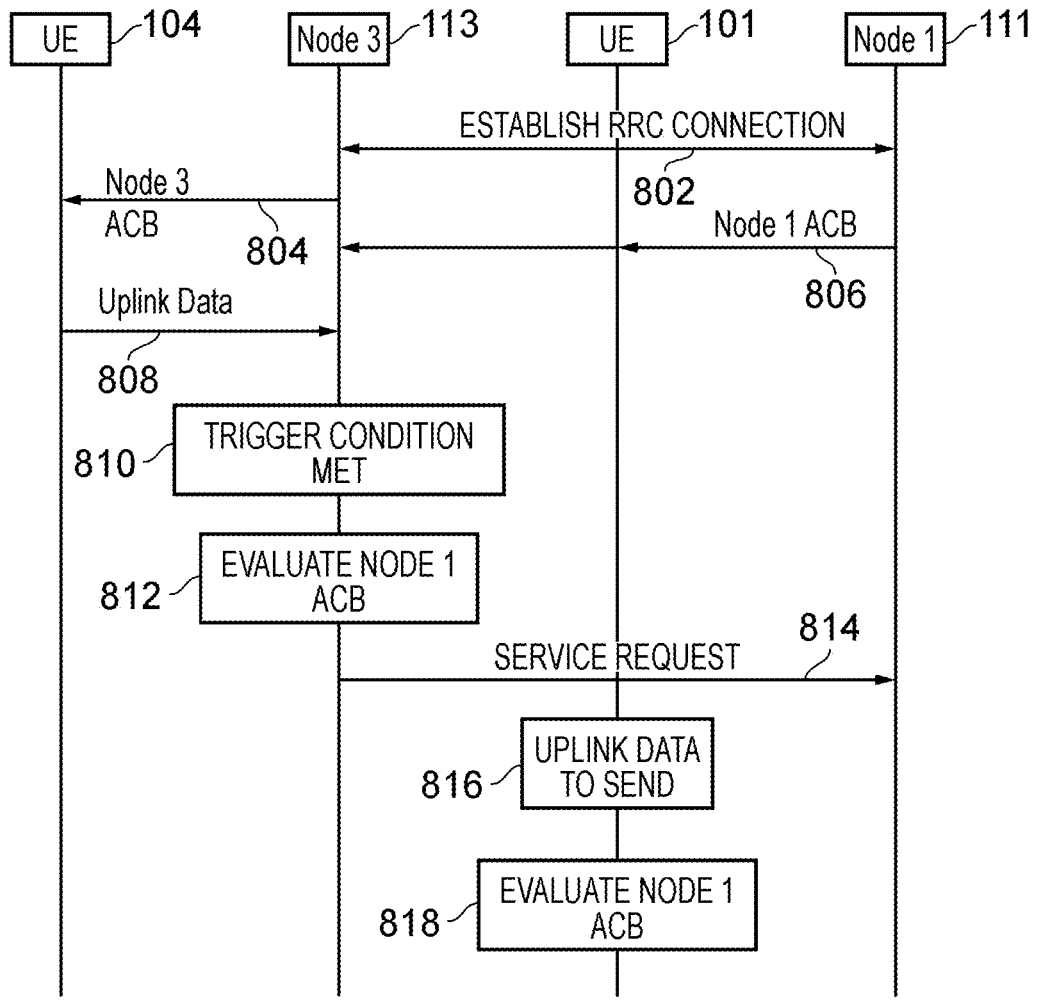
FIG. 8 is a message sequence chart illustrating a message flow in accordance with an example embodiment of the present disclosure.

FIG. 8 provides an illustration of a message sequence in accordance with an embodiment of the present technique.

Initially, the Node 3 113 establishes (802) an RRC connection with the Node 1 111, and the Node 113 thus enters the RRC Connected mode. The RRC connection establishment may be initiated by either the Node 3 113 or by the Node 1 111.

The Node 3 113 broadcasts its ACB parameters in system information (804), which are received by the fourth wireless communications device 104.

Figure 9:
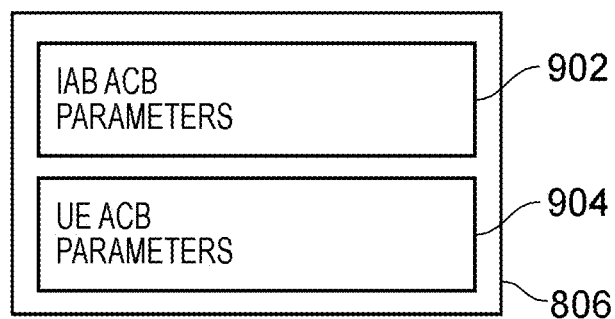
FIG. 9 is a diagram indicating the possible contents of a transmission by an infrastructure equipment in accordance with an example embodiment of the present disclosure.

The Node 1 111 broadcasts its ACB parameters, either in system information or using dedicated (i.e. non-broadcast) signalling (806), which are received by the Node 3 113 and the wireless communications device 101. An example of the signalling 806 is illustrated in FIG. 9. The signalling 806 may comprise IAB ACB parameters 902 and, in some embodiments, UE ACB parameters 904. The IAB ACB parameters 902 may apply to IAB nodes, such as the Node 3 113. The UE ACB parameters 904 may apply to UEs such as the first UE 101.

In FIG. 8 and FIG. 9, the Node 1 ACB parameters 806 are transmitted in a message which is received by both the Node 3 113 and by the first UE 101.

In some embodiments of the present technique, the first UE 101 and the Node 3 113 receive the UE ACB parameters 904 and the IAB ACB parameters 902 respectively, via different messages. For example, in order to accommodate conventional or legacy UEs, the UE ACB parameters 904 may be broadcast as part of system information; on the other hand, the IAB ACB parameters 902 may be transmitted to the Node 3 113 in dedicated signalling, when the Node 3 113 has an ongoing RRC connection with the Node 1 111.

The resources used for the transmission of the IAB ACB parameters 902 may be reserved for communications between IAB nodes, and may comprise a portion of a bandwidth part reserved for such purposes.

In some embodiments, different bandwidth parts may be reserved for communications between IAB nodes and for communications between an IAB node and a UE.

The IAB ACB parameters 902 may comprise a boolean or binary indication as to whether or not an IAB node (such as the Node 3 113) is permitted to request a service or to transmit IAB-specific information (such as the layer 2 measurements, alarm information or other IAB-specific information associated with the trigger condition being met 810).

In some embodiments, the TAB ACB parameters 902 comprise ACB parameters which are specific to a type of service which is requested, or a nature of information (e.g. alarm status. IAB routing request. QoS information, traffic load information or service request from a UE) which is to be transmitted. As such, the Node 3 113 may determine the service which has resulted in the trigger condition 810 being met, or the nature of the information which is to be sent as a result of the trigger condition 810 being met, and determine based on the IAB ACB parameters 902 whether it is permitted to transmit the service request 814.

For example, an upstream TAB node, such as the Node 1 111, may indicate that transmissions triggered by a service request from a UE are permitted, while routing requests are not permitted, in order to avoid any delay or failure to provide resources for the transmission of the UE's service request to the core network.

In some embodiments, the TAB ACB parameters 902 may comprise an indication of the ACB parameters applicable to IAB nodes by means of a specific class or access identity which is applicable to TAB nodes.

At step 810, a trigger condition at the Node 3 113 is met. This trigger may be as a result of receiving uplink data 808 from the fourth wireless communications device 104.

Other events may result in the trigger condition being met. For example, the Node 3 113 may determine that layer 2 measurements are to be transmitted to another IAB node. Alternatively, the Node 3 113 may have detected an alarm status which is to be reported to another TAB node. Alternatively, the Node 3 113 may be requesting one or more of a modification to quality of service parameters associated with a connection, a re-routing of data via the wireless backhaul, or a modification of an existing wireless backhaul route.

In response to the trigger condition being met, the Node 3 113, which is an TAB node, evaluates the TAB ACB parameters 902 indicated by the Node 1 111 in order to determine whether it is permitted to transmit a request, in response to the trigger condition.

For example, an TAB node (such as the Node 3 113) may determine whether it is permitted to transmit a service request based on the ACB parameters indicated for an access class, access category, or access identity which is predetermined (e.g. standardised) as associated with TAB nodes. For example, a new Access Class 16 may be defined as being applicable to TAB nodes. The TAB ACB parameters 902 may thus comprise an indication as to whether or not a device falling within Class 16 is permitted to transmit a service request.

Alternatively, in some embodiments, a new Access Identity or Access Category may be associated with communications devices providing TAB functionality, such as the Node 3 113 and the Node 1 111. As such, the IAB ACB parameters 902 may comprise an indication that devices meeting the criteria for the new Access Identity or Access Category associated with TAB nodes are, or are not, permitted to transmit a request.

In other words, the IAB ACB parameters 902 may comprise an indication of whether or not a communications device providing a wireless backhaul for the transmission of uplink data to a core network part of the wireless communications network is permitted to transmit the request.

As described above, in some embodiments, the Node 1 ACB information 806 may comprise UE ACB parameters 904.

FIG. 8 illustrates the use of these. Specifically, the first UE 101 which receives the Node 1 ACB information 806 may subsequently determine 816 that it has uplink data to transmit. This data may be associated with a particular application (e.g. multimedia telephony), or result from a specific procedure (e.g. user-initiated voice call).

The first UE 101 evaluates the UE ACB parameters 904 in light of the determination at 816 that it has uplink data to send. In the example illustrated in FIG. 8, the first UE 101 determines (for example, as a result of generating a random number and/or having regards to the specific categories for which ACB information is provided) that it is not permitted to request a connection for the transmission of the uplink data, and so the process terminates.

In an example embodiment of the present technique, the Node 1 ACB information 806 does not comprise separate ACB information for IAB nodes and for UEs. For example, in some embodiments, the Node 1 ACB information may comprise only the UE ACB parameters 904. In such embodiments, infrastructure equipment acting as an IAB node (such as the Node 3 113) determines whether it is permitted to transmit by considering itself as falling within a specific category of UEs. For example, an IAB node may determine whether it is permitted to transmit a service request based on the permissions indicated for a UE of a particular predetermined class, for example Class 15 (mobile network staff).

In the context of the scenario illustrated in FIG. 8, in accordance with some embodiments the Node 1 ACB information 806 may therefore comprise the UE ACB parameters 904 and no IAB ACB parameters 902. The Node 3 113, at step 812, evaluates the UE ACB parameters 904 as applicable to UEs of Class 15.

In some embodiments, an IAB node such as the Node 3 113 must perform an ACB evaluation in respect of each trigger condition 810 which may result in a service request 814 being transmitted.

In some other embodiments, no ACB check is performed by the Node 3 113 in respect of some, or all conditions. As such, in some cases, the service request 814 may be transmitted without any evaluation 812 of the Node 1 ACB parameters 806.

In some embodiments of the present technique, the Node 3 113 performs, in response to a trigger condition being met, a determination as to whether the nature of the trigger condition is such that the ACB evaluation 812 is to be carried out. For example, it may be determined that no ACB evaluation 812 is to be carried out if an alarm situation is to be notified to an upstream node. Additionally or alternatively, it may be determined that the ACB evaluation 812 is to be carried out if the trigger condition relates to a determination that layer 2 (L2) measurement information or charging information is to be reported to an upstream node.

A trigger condition may be met at an access stratum protocol entity as a result of the access stratum entity receiving a request (for example, for the transmission of a service request) initiated by a non-access stratum (NAS) protocol.

In some embodiments, the determination as to whether the evaluation 812 is to be carried out by the Node 3 113 is based on whether or not the Node 3 113 is in the RRC Connected mode. For example, if the Node 3 113 is in the RRC Connected mode, then no further evaluation is carried out, and the Node 3 113 determines that it is permitted to transmit the service request 814, based on the fact that it is in the RRC Connected mode, irrespective of any UE ACB parameter or IAB ACB parameter.

In response to the determination, the Node 3 113 either performs the evaluation (812) of the Node 1 ACB parameters (806) and proceeds based on the result of the evaluation 812 or, if no evaluation is to be carried out, initiates the service request procedure without carrying out an ACB evaluation.

In some embodiments an TAB node does not perform the ACB evaluation 812 in respect of service request transmissions in any circumstances. Accordingly, the Node 1 ACB parameters 806 may not comprise any TAB node-specific ACB parameters 902.

If, either as a result of performing the ACB evaluation 812 or as a result of determining that no such evaluation is required, the Node 3 113 determines that it is permitted to transmit the request, then it transmits the request 814. The transmission of the request 814 may be preceded by initial transmissions on, for example, a random access channel.

If the Node 3 113 determines that it is not permitted to transmit the request then instead of transmitting the request 814, it may indicate to the requesting entity (which may be, for example, the NAS entity) that the Node 3 113 is not permitted to transmit the request.

In some embodiments, the ability of an TAB node to transmit a service request or similar message in an upstream direction may affect whether or not a UE is able to obtain service from that node or from a downstream node. For example, as discussed above with regards to FIG. 6 and FIG. 7, an TAB node which receives a request from a UE for service may, in response, attempt to initiate a service request or similar request to an upstream TAB node.

If a request by an TAB node to an upstream node is prevented as a result of an ACB evaluation (such as the ACB evaluation 812 in FIG. 8) from transmitting the service request 814, then it will be necessary to terminate or reject a request from a UE (such as the UE 104).

In order to mitigate this, in some example embodiments of the present technique, each IAB node having one or more downstream TAB nodes, reserves resources on the wireless access interface which is used for the transmission of requests (such as the service request 814). Each IAB node may first determine the number of IAB nodes which are downstream of it in the topology (i.e. further away from the donor node). This may be by means of receiving an indication of the IAB topology from another IAB node. The IAB topology may be determined by the donor node and transmitted downstream from the donor node.

Based on the number of downstream IAB nodes, the IAB node may determine an amount of resources to reserve on the wireless access interface on which it may receive a request from a downstream IAB node. The IAB node may then reserve these resources to accommodate future requests from downstream IAB nodes; that is, it may refrain from allocating the reserved resources to other connections or for the use of other devices (such as UEs which transmit on the same wireless access interface).

For example, the Node 1 111 may receive, from either the Node 3 113 or the donor node 110, an indication that it has one downstream IAB node. In response, the Node 1 111 may determine an amount of resources to reserve on the wireless access interface 136.

As a result of having reserved resources available on the wireless access interface 136, the Node 1 111 may adjust the IAB ACB parameters 902 which are transmitted on the wireless access interface 136, to indicate that there is no restriction on the transmission of service requests by downstream IAB nodes, such as the Node 3 113.

In accordance with the sequence of messages illustrated in FIG. 8, the Node 3 113 may thus determine, in step 812, that it is permitted to transmit the service request message 814 to the Node 1 111.

In response to the receipt of the service request message 814, the Node 1 111 may use a portion of the reserved resources in order to provide transmission resources for the Node 3 113 to transmit on the uplink, for example, in order to transmit the uplink data 808 transmitted by the first UE 101. As such, it will be apparent that the present technique provides a means to ensure that uplink service via the wireless backhaul is available to UEs, such as the first UE 101.

In some embodiments, as part of, or in response to the reservation of resources, the Node 1 111 may additionally or alternatively update the UE ACB parameters 904 in order to restrict UEs such as the UE 101 from transmitting further requests, in order to effectively reserve the resources to support IAB node requests.

The Node 1 111 may repeat the steps of reserving resources in order to ensure that resources are available to support a subsequent request from a downstream IAB node. Such repetition may occur periodically, in response to the establishment or release of a connection, or in response to a modification of the IAB topology or routes.

In the descriptions of the example embodiments above, service requests are used as an example of a type of request from one IAB node to another, or as a trigger condition. However, it will be readily appreciated that the present disclosure is not so limited, and that the disclosure is applicable also to other request types, such as requests for an RLC channel, requests for a new bearer, requests for a new tunnel, IAB topology management requests and the like.

References to TAB nodes may, in some embodiments, also encompass other devices (such as wireless communications devices or UEs) which are performing the function of an IAB node.

Although the examples described above have been described for the case where the TAB node and/or UE performing the ACB check is in RRC Connected mode, in some embodiments the TAB node or UE may be in an idle mode or in an inactive mode.

Those skilled in the art would appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

The following numbered paragraphs provide further example aspects and features of the present technique:

Paragraph 1. An infrastructure equipment for providing a wireless backhaul for another infrastructure equipment in a wireless communications network, the infrastructure equipment comprising:
- a receiver configured to receive via a wireless access interface, from the other infrastructure equipment acting as a relay node, uplink data transmitted by a communications device,
- a transmitter configured to transmit to the infrastructure equipment acting as a relay node via the wireless access interface, and
- a controller configured to control the transmitter and the receiver
- to establish a connection with the other infrastructure equipment, the connection providing the wireless backhaul for the transmission of the uplink data from the communications device to a core network part of the wireless communications network via the other infrastructure equipment so that the other infrastructure equipment enters a connected mode, and
- to transmit in a message on the downlink of the wireless access interface an indication of whether the other infrastructure equipment is permitted to transmit a request while in the connected mode.

Paragraph 2. An infrastructure equipment according to Paragraph 1, wherein
- the indication of whether the other infrastructure equipment is permitted to transmit the request while in the connected mode comprises an indication that a communications device providing a wireless backhaul for the transmission of uplink data to a core network part of the wireless communications network is permitted to transmit the request.

Paragraph 3. An infrastructure equipment according to Paragraph 1 or Paragraph 2, wherein the indication of whether the other infrastructure equipment is permitted to transmit the request while in the connected mode comprises an indication which is reserved for infrastructure equipment acting as relay nodes.

Paragraph 4. An infrastructure equipment according to any of Paragraphs 1 to 3, wherein the infrastructure equipment includes a physical interface to the core network part, the infrastructure equipment acting as a donor infrastructure equipment providing the wireless backhaul to the other infrastructure equipment acting as the relay node.

Paragraph 5. An infrastructure equipment according to any of Paragraphs 1 to 4, wherein the controller is configured:
- to receive the request from the other infrastructure equipment, and
- the indication indicates that the other infrastructure equipment is permitted to transmit the request while in the connected mode.

Paragraph 6. An infrastructure equipment according to Paragraph 5, wherein the request is for a purpose, the purpose being one of:
- requesting a non-access stratum, NAS, service,
- requesting a new radio link control, RLC, channel,
- requesting a new wireless backhaul tunnel,
- indicating a node alarm status by the second infrastructure equipment,
- transmitting an indication of measurement results.
- requesting a modification to the route, and
- requesting a load balancing adjustment and
- the indication indicates that the second infrastructure equipment is permitted to transmit the request for the purpose while in the connected mode.

Paragraph 7. An infrastructure equipment according to any of Paragraphs 1 to 4, wherein the controller is configured:
- to receive from the other infrastructure equipment acting as the relay node a service request, and
- the indication indicates that the infrastructure equipment acting as a relay node is not permitted to transmit a request for a predetermined purpose while in the connected mode.

Paragraph 8. An infrastructure equipment acting as a relay node in a wireless communications network, the infrastructure equipment comprising:
- a transmitter for transmitting on a wireless access interface to another infrastructure equipment providing a wireless backhaul for the transmission of uplink data transmitted by a communications device,
- a receiver configured to receive via the wireless access interface from the other infrastructure equipment,
- a controller configured to control the transmitter and the receiver
- to establish a connection with the other infrastructure equipment, the connection providing the wireless backhaul for the transmission of the uplink data from the communications device to a core network part of the wireless communications network via the other infrastructure equipment so that the infrastructure equipment enters a connected mode, and
- to receive in a message transmitted by the other infrastructure equipment on the wireless access interface an indication of whether the infrastructure equipment is permitted to transmit a request while in the connected mode.

Paragraph 9. An infrastructure equipment according to Paragraph 8, wherein the indication of whether the infrastructure equipment is permitted to transmit the request while in the connected mode comprises an indication that a communications device providing a wireless backhaul for the transmission of uplink data to a core network part of the wireless communications network is permitted to transmit the request.

Paragraph 10. An infrastructure equipment according to Paragraph 8 or Paragraph 9, wherein the indication of whether the infrastructure equipment is permitted to transmit the request while in the connected mode comprises an indication which is reserved for infrastructure equipment acting as relay nodes.

Paragraph 11. An infrastructure equipment according to any of Paragraph 8 to 10, wherein the other infrastructure equipment providing the wireless backhaul includes a physical interface to the core network part, the other infrastructure equipment providing the wireless backhaul acting as a donor infrastructure equipment providing the wireless backhaul to the infrastructure equipment acting as the relay node.

Paragraph 12. An infrastructure equipment according to any of Paragraphs 8 to 11, wherein the controller is configured:
- based on the indication, to transmit the request to the other infrastructure equipment, and
- the indication indicates that the infrastructure equipment acting as a relay node is permitted to transmit the request while in the connected mode.

Paragraph 13. An infrastructure equipment according to Paragraph 12, wherein the service request is for a purpose, the purpose being one of:
  requesting a non-access stratum, NAS, service.
  requesting a new radio link control, RLC, channel,
  requesting a new wireless backhaul tunnel,
  indicating a node alarm status by the infrastructure equipment acting as a relay node,
  transmitting an indication of measurement results,
  requesting a modification to the route, and
  requesting a load balancing adjustment and
  the indication indicates that the infrastructure equipment is permitted to transmit the request for the purpose while in the connected mode.

Paragraph 14. An infrastructure equipment according to any of Paragraphs 8 to 11, wherein the controller is configured:
  to transmit the request to the other infrastructure equipment, and
  the indication indicates that the infrastructure equipment acting as a relay node is not permitted to transmit a request for a predetermined purpose while in the connected mode.

Paragraph 15. An infrastructure equipment for providing a wireless backhaul for another infrastructure equipment in a wireless communications network, the infrastructure equipment comprising:
  a receiver configured to receive via a wireless access interface, from the other infrastructure equipment acting as a relay node, uplink data transmitted by a communications device,
  a transmitter configured to transmit to the infrastructure equipment acting as a relay node via the wireless access interface, and
  a controller configured to control the transmitter and the receiver
  to establish a connection with the other infrastructure equipment, the connection providing the wireless backhaul for the transmission of the uplink data from the communications device to a core network part of the wireless communications network via the other infrastructure equipment so that the other infrastructure equipment enters a connected mode,
  to transmit in a message on the downlink of the wireless access interface an indication that request transmissions are not permitted while in the connected mode, and
  to receive a request transmitted by the other infrastructure equipment.

Paragraph 16. An infrastructure equipment acting as a relay node in a wireless communications network, the infrastructure equipment comprising:
  a transmitter for transmitting on a wireless access interface to another infrastructure equipment providing a wireless backhaul for the transmission of uplink data transmitted by a communications device,
  a receiver configured to receive via the wireless access interface from the other infrastructure equipment,
  a controller configured to control the transmitter and the receiver
  to establish a connection with the other infrastructure equipment, the connection providing the wireless backhaul for the transmission of the uplink data from the communications device to a core network part of the wireless communications network via the other infrastructure equipment so that the infrastructure equipment enters a connected mode,
  to receive in a message transmitted by the other infrastructure equipment providing the wireless backhaul on the wireless access interface an indication that request transmissions are not permitted while in the connected mode, and
  to transmit a request to the infrastructure equipment providing the wireless backhaul.

Paragraph 17. Circuitry for an infrastructure equipment for providing a wireless backhaul for another infrastructure equipment in a wireless communications network, the circuitry comprising:
  receiver circuitry configured to receive via a wireless access interface, from the other infrastructure equipment acting as a relay node, uplink data transmitted by a communications device,
  transmitter circuitry configured to transmit to the infrastructure equipment acting as a relay node via the wireless access interface, and
  controller circuitry configured to control the transmitter circuitry and the receiver circuitry
  to establish a connection with the other infrastructure equipment, the connection providing the wireless backhaul for the transmission of the uplink data from the communications device to a core network part of the wireless communications network via the other infrastructure equipment so that the other infrastructure equipment enters a connected mode, and
  to transmit in a message on the downlink of the wireless access interface an indication of whether the other infrastructure equipment is permitted to transmit a request while in the connected mode.

Paragraph 18. Circuitry for an infrastructure equipment acting as a relay node in a wireless communications network, the circuitry comprising:
  transmitter circuitry for transmitting on a wireless access interface to another infrastructure equipment providing a wireless backhaul for the transmission of uplink data transmitted by a communications device,
  receiver circuitry configured to receive via the wireless access interface from the other infrastructure equipment,
  controller circuitry configured to control the transmitter circuitry and the receiver circuitry
  to establish a connection with the other infrastructure equipment, the connection providing the wireless backhaul for the transmission of the uplink data from the communications device to a core network part of the wireless communications network via the other infrastructure equipment so that the infrastructure equipment enters a connected mode, and
  to receive in a message transmitted by the other infrastructure equipment on the wireless access interface an indication of whether the infrastructure equipment is permitted to transmit a request while in the connected mode.

Paragraph 19. Circuitry for an infrastructure equipment for providing a wireless backhaul for another infrastructure equipment in a wireless communications network, the circuitry comprising:
  receiver circuitry configured to receive via a wireless access interface, from the other infrastructure equipment acting as a relay node, uplink data transmitted by a communications device,
  transmitter circuitry configured to transmit to the infrastructure equipment acting as a relay node via the wireless access interface, and a controller configured to control the transmitter and the receiver to establish a connection with the other infrastructure equipment, the connection providing the wireless backhaul for the transmission of the uplink data from the communications device to a core network part of the wireless communications network via the other infrastructure equipment so that the other infrastructure equipment enters a connected mode, to transmit in a message on the downlink of the wireless access interface an indication that request transmissions are not permitted while in the connected mode, and to receive a request transmitted by the other infrastructure equipment.

Paragraph 20. Circuitry for an infrastructure equipment acting as a relay node in a wireless communications network, the circuitry comprising:

transmitter circuitry for transmitting on a wireless access interface to another infrastructure equipment providing a wireless backhaul for the transmission of uplink data transmitted by a communications device, receiver circuitry configured to receive via the wireless access interface from the other infrastructure equipment, controller circuitry configured to control the transmitter circuitry and the receiver circuitry to establish a connection with the other infrastructure equipment, the connection providing the wireless backhaul for the transmission of the uplink data from the communications device to a core network part of the wireless communications network via the other infrastructure equipment so that the infrastructure equipment enters a connected mode, to receive in a message transmitted by the other infrastructure equipment providing the wireless backhaul on the wireless access interface an indication that request transmissions are not permitted while in the connected mode, and to transmit a request to the infrastructure equipment providing the wireless backhaul.

Paragraph 21. A method of operating an infrastructure equipment for providing a wireless backhaul for another infrastructure equipment in a wireless communications network, the method comprising:

establishing a connection with the other infrastructure equipment, the connection providing the wireless backhaul for the transmission of uplink data transmitted by a communications device to a core network part of the wireless communications network via the other infrastructure equipment so that the other infrastructure equipment enters a connected mode, and transmitting in a message on the downlink of a wireless access interface an indication of whether the other infrastructure equipment is permitted to transmit a request while in the connected mode.

Paragraph 22. A method of operating an infrastructure equipment acting as a relay node in a wireless communications network, the method comprising:

establishing a connection with another infrastructure equipment providing a wireless backhaul for the transmission of uplink data transmitted by a communications device, the connection providing the wireless backhaul for the transmission of the uplink data from the communications device to a core network part of the wireless communications network via the other infrastructure equipment so that the infrastructure equipment enters a connected mode, and receiving in a message transmitted by the other infrastructure equipment on a wireless access interface an indication of whether the infrastructure equipment is permitted to transmit a request while in the connected mode.

Paragraph 23. A method of operating an infrastructure equipment for providing a wireless backhaul for another infrastructure equipment in a wireless communications network, the method comprising:

establishing a connection with the other infrastructure equipment acting as a relay node, the connection providing the wireless backhaul for the transmission of uplink data transmitted by a communications device from the communications device to a core network part of the wireless communications network via the other infrastructure equipment so that the other infrastructure equipment enters a connected mode, transmitting in a message on the downlink of a wireless access interface an indication that request transmissions are not permitted while in the connected mode, and receiving a request transmitted by the other infrastructure equipment.

Paragraph 24. A method of operating an infrastructure equipment acting as a relay node in a wireless communications network, the circuitry comprising:

transmitter circuitry for transmitting on a wireless access interface to another infrastructure equipment providing a wireless backhaul for the transmission of uplink data transmitted by a communications device, receiver circuitry configured to receive via the wireless access interface from the other infrastructure equipment, controller circuitry configured to control the transmitter circuitry and the receiver circuitry establishing a connection with another infrastructure equipment, the connection providing a wireless backhaul for the transmission of uplink data transmitted by a communications device from the communications device to a core network part of the wireless communications network via the other infrastructure equipment so that the infrastructure equipment enters a connected mode, receiving in a message transmitted by the other infrastructure equipment providing the wireless backhaul on a wireless access interface an indication that request transmissions are not permitted while in the connected mode, and transmitting a request to the infrastructure equipment providing the wireless backhaul.

REFERENCES

[1] Holma H. and Toskala A, "LTE for UMTS OFDMA and SC-FDMA based radio access", John Wiley and Sons, 2009
[2] RP-172834, "Revised WID on New Radio Access Technology," NTT DOCOMO, RAN #78
[3] 3GPP TS 36.331 v.15.0.1 "Evolved Universal Terrestrial Radio Access (E-UTRA); Radio Resource Control (RRC); Protocol specification"
[4] 3GPP TS 22.011 v.16.0.0 "Service accessibility"
[5] 3GPP TS 22.261 v.16.2.0 "Service requirements for the 5G system"

[6] R3-181502 "Way Forward—IAB Architecture for L2/3 relaying", Qualcomm et al., 3GPP T5G RAN WG3 Meeting #99, 2018

What is claimed is:

1. A wireless communication apparatus acting as an Integrated Access and Backhaul (IAB) node in a wireless communications network, the wireless communication apparatus comprising:
a controller configured to
establish a connection with a second wireless communication apparatus acting as an upstream IAB node of the wireless communication apparatus, the connection providing a wireless backhaul for transmission of uplink data from a communications device to a core network part of the wireless communications network via the second wireless communication apparatus so that the wireless communication apparatus enters a connected mode;
receive access category barring information, transmitted by the second wireless communication apparatus indicating the wireless communication apparatus is not permitted to transmit a request while in the connected mode; and
transmit the request to the second wireless communication apparatus without evaluating the access category barring information.

2. The wireless communication apparatus of claim 1, wherein
the access category barring information includes an indication that a communications device providing a wireless backhaul for the transmission of uplink data to the core network part of the wireless communications network is permitted to transmit the request.

3. The wireless communication apparatus of claim 1, wherein
the access category barring information includes an indication which is reserved for infrastructure equipment acting as IAB nodes.

4. The wireless communication apparatus of claim 1, wherein
the second wireless communication apparatus includes a physical interface to the core network part.

5. The wireless communication apparatus of claim 4, wherein
the second wireless communication apparatus providing the wireless backhaul is configured to act as a donor infrastructure equipment providing the wireless backhaul to the wireless communication apparatus acting as the IAB node.

6. The wireless communication apparatus of claim 1, wherein the request is for a purpose, the purpose being at least one of:
requesting a non-access stratum, NAS, service,
requesting a new radio link control, RLC, channel,
requesting a new wireless backhaul tunnel,
indicating a node alarm status by the infrastructure equipment acting as a relay node,
transmitting an indication of measurement results,
requesting a modification to the route, and
requesting a load balancing adjustment.

7. The wireless communication apparatus of claim 6, wherein
the access category barring information indicates that the infrastructure equipment is permitted to transmit the request for the purpose while in the connected mode.

8. A method performed by a wireless communication apparatus acting as an Integrated Access and Backhaul (IAB) node in a wireless communications network, the method comprising:
establishing a connection with a second wireless communication apparatus acting as an upstream IAB node of the wireless communication apparatus, the connection providing a wireless backhaul for transmission of uplink data from a communications device to a core network part of the wireless communications network via the second wireless communication apparatus so that the wireless communication apparatus enters a connected mode;
receiving access category barring information, transmitted by the second wireless communication apparatus indicating the wireless communication apparatus is not permitted to transmit a request while in the connected mode; and
transmitting the request to the second wireless communication apparatus without evaluating the access category barring information.

9. The method of claim 8, wherein
the access category barring information includes an indication that a communications device providing a wireless backhaul for the transmission of uplink data to the core network part of the wireless communications network is permitted to transmit the request.

10. The method of claim 8, wherein
the access category barring information includes an indication which is reserved for infrastructure equipment acting as IAB nodes.

11. The method of claim 8, wherein
the second wireless communication apparatus includes a physical interface to the core network part.

12. The method of claim 11, wherein
the second wireless communication apparatus providing the wireless backhaul is configured to act as a donor infrastructure equipment providing the wireless backhaul to the wireless communication apparatus acting as the IAB node.

13. The method of claim 8, wherein the request is for a purpose, the purpose being at least one of:
requesting a non-access stratum, NAS, service,
requesting a new radio link control, RLC, channel,
requesting a new wireless backhaul tunnel,
indicating a node alarm status by the infrastructure equipment acting as a relay node,
transmitting an indication of measurement results,
requesting a modification to the route, and
requesting a load balancing adjustment.

14. The method of claim 13, wherein
the access category barring information indicates that the infrastructure equipment is permitted to transmit the request for the purpose while in the connected mode.

15. Circuitry for a wireless communication apparatus acting as an Integrated Access and Backhaul (IAB) node in a wireless communications network, the circuitry configured to:
establish a connection with a second wireless communication apparatus acting as an upstream IAB node of the wireless communication apparatus, the connection providing a wireless backhaul for transmission of uplink data from a communications device to a core network part of the wireless communications network via the second wireless communication apparatus so that the wireless communication apparatus enters a connected mode;

receive access category barring information, transmitted by the second wireless communication apparatus indicating the wireless communication apparatus is not permitted to transmit a request while in the connected mode; and transmit the request to the second wireless communication apparatus without evaluating the access category barring information.

\* \* \* \* \*